United States Patent Office 3,055,890
Patented Sept. 25, 1962

3,055,890
PHENTHIAZINE DERIVATIVES
Robert Michel Jacob, Ablon-sur-Seine, and Raymond Jacques Horclois, Malakoff, France, assignors to Societe des Usines Chimiques Rhone-Poulenc, Paris, France, a corporation of France
No Drawing. Filed Jan. 14, 1959, Ser. No. 786,671
Claims priority, application France Jan. 24, 1958
8 Claims. (Cl. 260—243)

This invention relates to new derivatives of phenthiazine, to processes for their preparation, and pharmaceutical compositions containing them.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess unexpectedly useful pharmacological properties of a nature hereinafter referred to in detail and of a degree of activity that could not have been predicted from knowledge of their chemical structure.

The phenthiazine derivatives of the present invention are those which conform to the general formula:

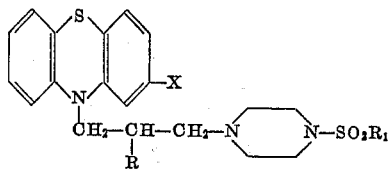

(I)

and their acid addition and quaternary ammonium salts, wherein X represents a hydrogen or halogen atom, a lower alkyl, alkoxy or acyl group or a cyano, methylthio, methanesulphonyl, dimethylsulphamoyl or trifluoromethyl group, R represents a hydrogen atom or a methyl group and $R_1$ represents a lower alkyl group. The word "lower" as herein applied to alkyl, alkoxy and acyl groups means that the group in question contains not more than four carbon atoms.

These new phenthiazine compounds may be prepared by the application of known methods for the conversion of phenthiazine and its C-substituted products into the corresponding 10-aminolkayl-phenthiazines. Such methods when so applied can be defined generically as comprising the interaction of a phenthiazine derivative of the formula:

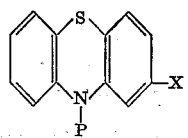

(II)

(wherein X is as hereinbefore defined) with a compound Q, the group P and the compound Q being such that they will interact to produce or form in the 10-position of the phenthiazine nucleus a grouping of the formula:

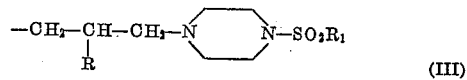

(III)

(wherein R and $R_1$ are as hereinafter defined).

According to a feature of the present invention, the phenthiazine derivatives of general Formula I are prepared by a process which comprises reacting a piperazine derivative of the general formula:

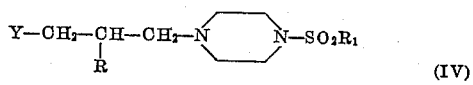

(IV)

(wherein Y represents the acid residue of a reactive ester such as a halogen atom or a sulphuric or sulphonic ester residue and the other symbols are as hereinbefore defined), or an acid addition salt thereof, with a phenthiazine of the general formula:

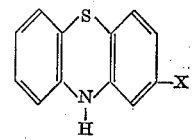

(V)

(wherein X is as hereinbefore defined). Where X is an acyl group, it may be advantageous to protect this group during the reaction, for example, by forming an anil or ketal.

The reaction may be effected with or without a solvent in the presence or absence of a condensing agent. It is advantageous to use a solvent of the group of aromatic hydrocarbons (for example, toluene or xylene) in the presence of a condensing agent, preferably of the class of alkali metals and their derivatives (such as, for example, hydrides, amides, hydroxides, alcoholates, metal alkyls or aryls) and, more particularly, metallic sodium, sodamide, powdered sodium or potassium hydroxide, lithium hydride, sodium tert-butoxide, butyllithium and phenyllithium. The reaction is preferably carried out at the boiling temperature of the solvent. It is advantageous to use the reactive ester of Formula IV in the form of the free base in solution in, for example, benzene, toluene or xylene, and to add it to the mixture of the other reactants wherein the phenthiazine employed may already be present, in part at least, in the form of an alkali metal salt. The reaction may also be effected with a salt of the reactive ester but in this case a greater proportion of the condensing agent must be in order to neutralise the acid of the salt employed.

According to a further feature of the present invention, the new phenthiazine derivatives of Formula I are prepared by the process which comprises reacting a phenthiazine of the general formula:

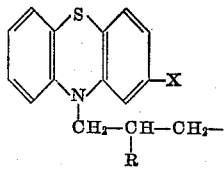

(VI)

(wherein X, R and Y are as hereinbefore defined) with a piperazine of the general formula:

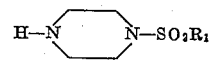

(VII)

(wherein $R_1$ is as hereinbefore defined). The reaction is preferably carried out in an inert organic medium, for example, in a solvent such as an alcohol.

According to another feature of the invention, the phenthiazine derivatives conforming to Formula I are prepared by reacting a piperazinylalkylphenthiazine of the general formula:

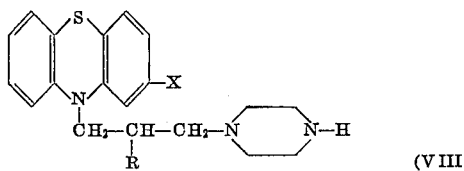

(wherein X and R are as hereinbefore defined) with an alkanesulphonyl halide of the formula Hal—SO$_2$R$_1$ (wherein Hal represents a halogen atom and R$_1$ is as hereinbefore defined). The reaction may be effected by heating the reagents in a halogenated hydrocarbon (for example, chloroform) or an aromatic hydrocarbon (for example, toluene) solvent optionally in the presence of a tertiary organic base (for example, pyridine).

According to a still further feature of the invention, the phenthiazine derivatives of Formula I are prepared by the process which comprises the decarboxylation of a phenthiazine-10-carboxylate of the general formula:

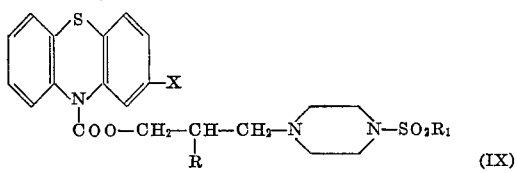

(wherein the various symbols are as hereinbefore defined) by heating to a temperature above 100° C., preferably between 150 and 250° C., until evolution of carbon dioxide ceases. There is no advantage in operating at temperatures higher than 250° C. since the reaction products are then generally more discoloured. The reaction can be effected with the phenthiazine-10-carboxylate alone, i.e. without a diluent, or in an inert organic solvent of high boiling point such as diphenyl oxide, quinoline, weak bases or o-dichlorobenzene.

The phenthiazine-10-carboxylates of Formula IX may be obtained by known methods, for the preparation of aminoalkyl phenthiazine-10-carboxylate, for example, by reaction of a halide (or an ester) of a phenthiazinyl-10-carboxylic acid upon a compound of the general formula:

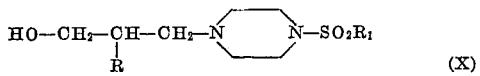

(wherein R and R$_1$ are as hereinbefore defined).

The new phenthiazine derivatives of the invention possess pharmacodynamic properties; in particular, sedative, analgesic and antiemetic properties. They are especially useful as antiemeters; they are of low toxicity and give practically no undesirable secondary effects.

Compounds of outstanding importance are:

3-cyano-10-[3-(4 - methanesulphonyl - 1 - piperazinyl)-propyl]phenthiazine,
3-methanesulphonyl-10-[3 - (4 - methanesulphonyl - 1-piperazinyl)propyl]phenthiazine,
3-dimethylsulphamoyl-10-[3-(4 - methanesulphonyl - 1-piperazinyl)propyl]phenthiazine,
3-cyano-10-[3-(4-ethanesulphonyl-1 - piperazinyl)propyl]-phenthiazine,
3-dimethylsulphamoyl-10-[3-(4-ethanesulphonyl-1 - piperazinyl)propyl]phenthiazine,
3-methanesulphonyl-10-[3-(4-methanesulphonyl-1 - piperazinyl)-2-methylpropyl]phenthiazine, and
3-dimethylsulphamoyl-10-[3-(4 - methanesulphonyl - 1-piperazinyl)-2-methylpropyl]phenthiazine,
especially 3-dimethylsulphamoyl-10-[3-(4 - methanesulphonyl-1-piperazinyl)propyl]phenthiazine.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. However, they may also be employed in the form of non-toxic quaternary ammonium salts obtained by reaction with organic halides (e.g. methyl or ethyl iodide, chloride or bromide or allyl or benzyl chloride or bromide) or other reactive esters, e.g. toluene-p-sulphonates.

The present invention includes within its scope pharmaceutical compositions comprising one or more of the compounds of Formula I, or an acid addition or quaternary ammonium salt thereof, and a significant amount of a pharmaceutical carrier which may be either a solid material or a liquid.

Preparations for oral ingestion can be liquids or solids or any combination of these forms, such as solutions, suspensions, syrups, elixirs, emulsions, powders or tablets. Pharmaceutical preparations for administration of the active therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should be administered so as to give, in the case of oral administration, 10 to 500 mg. of active substance per day and, in the case of parenteral administration, 5 to 300 mg. of such substance per day.

The following examples illustrate the invention.

*Example I*

3-dimethylsulphamoylphenthiazine (113 g.) is dissolved in toluene (1,100 cc.) with agitation and heating under reflux. A hot toluene solution (175 cc.) containing sodium dimethylphenylmethoxide (63.2 g.) is added over a period of 5 minutes. There is then added over a period of 15 minutes a toluene solution (360 cc.) containing 1-(3-chloropropyl)-4-methanesulphonylpiperazine (96.2 g.) and heating under reflux and agitation are continued for 5 hours. When cold the solution is washed with water (600 cc.) and the toluene solution is agitated with N hydrochloric acid (500 cc.). The hydrochloride of the product precipitates as a glue. This hydrochloride is treated with chloroform (250 cc.) and a saturated solution (120 cc.) of potassium carbonate. On distillation of the chloroform there is obtained 3-dimethylsulphamoyl - 10 - [3 - (4 - methanesulphonyl - 1 - piperazinyl)propyl]phenthiazine (190 g.) which, after purification by chromatography over alumina and recrystallisation from toluene, melts at 170° C.

*Example II*

Proceeding as in Example I but commencing with 3-cyanophenthiazine (22.4 g.), there is obtained 3-cyano-10 - [3 - (4 - methanesulphonyl - 1 - piperazinyl)propyl]-phenthiazine (14.1 g.), M.P. 166–168° C.

Example III

Methanesulphonyl chloride (3 g.) is added dropwise over a period of 5 minutes to a solution of 3-cyano-10-[3-(1-piperazinyl)propyl]phenthiazine (8.8 g.) in toluene (50 cc.) and anhydrous pyridine (2.1 g.). The mixture is heated for 3 hours on the water-bath, and then treated with 8% sodium hydroxide solution (50 cc.) and chloroform (50 cc.). After decantation, the aqueous fraction is extracted with chloroform (2×20 cc.). The chloroform solution is washed with water, dried over potassium carbonate and concentrated in vacuo. There is obtained 3-cyano-10-[3-(4-methanesulphonyl-1-piperazinyl)propyl]phenthiazine (9.5 g.) which, after recrystallisation from benzene, melts at 166–168° C.

Example IV

Methanesulphonyl chloride (6 g.) is added over a period of 5 minutes with agitation to a solution of 3-chloro-10-[3-(1-piperazinyl)propyl]phenthiazine (17.9 g.) in toluene (120 cc.) and anhydrous pyridine (4.2 g.). The mixture is left to stand overnight at 20° C. and is then heated on the water-bath for 2½ hours. 8% sodium hydroxide solution (100 cc.) and chloroform (100 cc.) are added. On washing with water, drying over potassium carbonate and concentrating in vacuo, there is obtained 3-chloro-10-[3-(4-methanesulphonyl-1-piperazinyl)propyl]phenthiazine (20 g.) which, after recrystallisation from ethanol, melts at 138° C.

Example V

Proceeding as in Example IV but commencing with methanesulphonyl chloride (1.9 g.) and 3-dimethylsulphamoyl-10-[3-(1-piperazinyl)propyl]phenthiazine (6.5 g.), there is obtained 3-dimethylsulphamoyl-10-[3-(4-methanesulphonyl-1-piperazinyl)propyl]phenthiazine (7.3 g.) which, after recrystallisation from methanol, melts at 166° C.

Example VI

A solution of methanesulphonyl chloride (3.43 g.) in chloroform (10 cc.) is added over a period of 5 minutes to a solution of 10-[3-(1-piperazinyl)propyl]phenthiazine (8.1 g.) in chloroform (50 cc.) and anhydrous pyridine (2.4 g.). The mixture is heated under reflux with agitation for 5 hours and, after being left to cool, is agitated with a saturated solution of potassium carbonate (25 cc.). It is then washed with water (3×20 cc.) and dried over potassium carbonate. The chloroform is distilled off in vacuo and the residue dissolved in benzene and purified by chromatography over a column of alumina. The fractions are crystallised from ethanol (160 cc.) and there is obtained 10-[3-(4-methanesulphonyl-1-piperazinyl)propyl]phenthiazine (5 g.), M.P. 120–122° C.

Example VII

Proceeding as in Example VI but commencing with 3-methyl-10-[3-(1-piperazinyl)propyl]phenthiazine (8.5 g.) and recrystallising from benzene and cyclohexane, there is obtained 3-methyl-10-[3-(4-methanesulphonyl-1-piperazinyl)propyl]phenthiazine (8 g.), M.P. 121–123° C.

Example VIII

Proceeding as in Example VI but commencing with 3-ethyl-10-[3-(1-piperazinyl)propyl]phenthiazine (8.8 g.) and recrystallising from ethanol, there is obtained 3-ethyl-10-[3-(4-methanesulphonyl-1-piperazinyl)propyl]phenthiazine (7.5 g.), M.P. 131–133° C.

Example IX

Proceeding as in Example VI but commencing with 3-methoxy-10-[3-(1-piperazinyl)propyl]phenthiazine (10.6 g.) and methanesulphonyl chloride (3.8 g.) and recrystallising from ethanol, there is obtained 3-methoxy-10-[3-(4-methanesulphonyl-1-piperazinyl)propyl]phenthiazine (6 g.), M.P. 118° C.

Example X

Proceeding as in Example VI but commencing with 3-methanesulphonyl-10-[3-(1-piperazinyl)propyl]phenthiazine (6 g.) in toluene and methanesulphonyl chloride (1.7 g.) and recrystallising from ethyl acetate and acetone, there is obtained 3-methanesulphonyl-10-[3-(4-methanesulphonyl-1-piperazinyl)propyl]phenthiazine (5.1 g.), M.P. 180–182° C.

Example XI

Proceeding as in Example VI but commencing with 3-isopropoxy-10-[3-(1-piperazinyl)propyl]phenthiazine (15.3 g.) and methanesulphonyl chloride (5.45 g.), there is obtained 3-isopropoxy-10-[3-(4-methanesulphonyl-1-piperazinyl)propyl]phenthiazine, the acid maleate of which, prepared in ethyl acetate, melts at 144–146° C.

Example XII

Proceeding as in Example VI but commencing with 3-methylthio-10-[3-(1-piperazinyl)propyl]phenthiazine (7.4 g.) and methanesulphonyl chloride (2.5 g.) and recrystallising from ethyl acetate, there is obtained 3-methylthio-10-[3-(4-methanesulphonyl-1-piperazinyl)propyl]phenthiazine (5.5 g.), M.P. 148° C.

Example XIII

Proceeding as in Example VI but commencing with 3-dimethylsulphamoyl-10-[3-(1-piperazinyl)-2-methylpropyl]phenthiazine (8.9 g.), there is obtained 3-dimethylsulphamoyl-10-[3-(4-methanesulphonyl-1-piperazinyl)-2-methylpropyl]phenthiazine, the hydrochloride of which, prepared in methanol, melts at about 252° C. with decomposition.

Example XIV

Proceeding as in Example VI but commencing with 3-chloro-10-[3-(1-piperazinyl)propyl]phenthiazine (19 g.) and ethanesulphonyl chloride (7.7 g.) and recrystallising from ethanol, there is obtained 3-chloro-10-[3-(4-ethanesulphonyl-1-piperazinyl)propyl]phenthiazine (13.1 g.), M.P. 93° C.

Example XV

Proceeding as in Example VI but commencing with 3-cyano-10-[3-(1-piperazinyl)propyl]phenthiazine (17.5 g.) and ethanesulphonyl chloride (6.4 g.) and recrystallising from ethyl acetate, there is obtained 3-cyano-10-[3-(4-ethanesulphonyl-1-piperazinyl)propyl]phenthiazine (13.5 g.), M.P. 128–130° C.

Example XVI

Proceeding as in Example VI but commencing with 3-dimethylsulphamoyl-10-[3-(1-piperazinyl)propyl]phenthiazine (6.5 g.) and ethanesulphonyl chloride (2 g.) and recrystallising from methanol, there is obtained 3-dimethylsulphamoyl-10-[3-(4-ethanesulphonyl-1-piperazinyl)propyl]phenthiazine (3.3 g.), M.P. 119° C.

Example XVII

A solution of methanesulphonyl chloride (3.1 g.) in chloroform (5 cc.) is added over 15 minutes to a solution of 3-trifluoromethyl-10-[3-(1-piperazinyl)propyl]phenthiazine (9.9 g.) in chloroform (50 cc.) and anhydrous pyridine (2.1 g.). The mixture is heated under reflux with agitation for 2 hours and, after being left to cool, is agitated with a saturated solution (40 cc.) of potassium carbonate. The chloroform is distilled off and a solution of the residue in benzene containing 25% cyclohexane is purified by chromatography over a column of alumina. There is obtained 3-trifluoromethyl-10-[3-(4-methanesulphonyl-1-piperazinyl)propyl]phenthiazine (10.5 g.), which melts at 157° C. after recrystallisation from ethanol.

Example XVIII

Proceeding as in Example XVII but commencing with 3-methylthio-10-[3-(1-piperazinyl)-2-methylpropyl]

phenthiazine (12.5 g.) and methanesulphonyl chloride (3.8 g.), there is obtained 3-methylthio-10[3-(4-methanesulphonyl-1-piperazinyl) - 2 - methylpropyl]phenthiazine (8.6 g.), M.P. 177° C.

*Example XIX*

Proceeding as in Example XVII but commencing with 3 - methanesulphonyl - 10 - [3-(1-piperazinyl)-2-methylpropyl]phenthiazine (12.5 g.) and methanesulphonyl chloride (3.8 g.), there is obtained 3-methanesulphonyl-10 - (4 - methanesulphonyl - 1-piperazinyl)-2-methylpropyl]phenthiazine (11.7 g.), which melts at 178° C. after recrystallisation from ethyl acetate.

*Example XX*

Proceeding as in Example XVII but commencing with 3 - chloro - 10 - [3 - (1-piperazinyl)propyl]phenthiazine (10.8 g.) and butanesulphonyl bromide (6.6 g.), there is obtained after purification by chromatography and recrystallisation from ethanol, 3-chloro-10-[3-(4-butanesulphonyl - 1 - piperazinyl)propyl]phenthiazine (8.6 g.), M.P. 96° C.

*Example XXI*

Proceeding as in Example XVII but commencing with 3 - dimethylsulphamoyl - 10 - [3-(1-piperazinyl)propyl]phenthiazine (13 g.) and butanesulphonyl bromide (6.6 g.), there is obtained, after recrystallisation from ethanol, 3 - dimethylsulphamoyl - 10-[3-(4-butanesulphonyl-1 - piperazinyl)propyl]phenthiazine (11.6 g.), M.P. 136–138° C.

*Example XXII*

Proceeding as in Example XVII but commencing with 3 - chloro - 10 - [3-(1-piperazinyl)propyl]phenthiazine (10.8 g.) and propanesulphonyl bromide (6.2 g.), there is obtained, after chromatography and recrystallisation from ethanol, 3 - chloro - 10 - [3 - (4-propanesulphonyl-1-piperazinyl)propyl]phenthiazine (7.5 g.), M.P. 112° C.

*Example XXIII*

Proceeding as in Example XVII but commencing with 3 - dimethylsulphamoyl 10 - [3 - (1-piperazinyl)propyl]phenthiazine (13 g.) and propanesulphonyl bromide (6.2 g.), there is obtained, after chromatography and recrystallisation from ethanol, 3 - dimethylsulphamoyl-10-[3 - (4 - propanesulphonyl - 1 - piperazinyl)propyl]phenthiazine (10.6 g.), M.P. 134° C.

*Example XXIV*

3 - chloro - 10 - [3-(4-methanesulphonyl-1-piperazinyl)propoxycarbonyl]-phenthiazine (1 g.) is heated for 1 hour at about 230° C. under a pressure of 1.5 mm. Hg. The product is recrystallised from ethanol and there is obtained 3 - chloro - 10 - [3-(4-methanesulphonyl-1-piperazinyl)propyl]phenthiazine (0.4 g.), M.P. 138° C.

3 - chloro - 10-[3-(4-methanesulphonyl-1-piperazinyl)propoxycarbonyl]phenthiazine is prepared by heating 3-chloro-10-phenthiazinylcarbonyl chloride (29.6 g.) with 1 - methanesulphonyl - 4- (3 - hydroxypropyl)piperazine (25 g.) in butanone with potassium carbonate (1.4 g.) for 18 hours under reflux. After concentration in vacuo the residue is treated with a saturated solution (50 cc.) of potassium carbonate and chloroform (100 cc.). The base is extracted with 10% hydrochloric acid (75 cc.) and is liberated with potassium carbonate and extracted with chloroform. There is obtained 3-chloro-10-[3-(4-methanesulphonyl - 1 - piperazinyl)propoxycarbonyl]phenthiazine (21.5 g.), which melts at 130° C. after recrystallisation from ethanol.

*Example XXV*

Proceeding as in Example XXIV but commencing with 3 - dimethylsulphamoyl - 10 - [3-(4-methanesulphonyl-1-piperazinyl)propoxycarbonyl]phenthiazine (1 g.), there is obtained 3 - dimethylsulphamoyl - 10 - [3 - (4 - methanesulphonyl-1-piperazinyl)propyl]phenthiazine (0.4 g.), which melts at 165–166° C.

3 - dimethylsulphamoyl - 10 - [3-(4-methanesulphonyl-1-piperazinyl)propoxycarbonyl]phenthiazine is prepared by heating 3-dimethylsulphamoyl-10-phenthiazinylcarbonyl chloride (9 g.) with 1-(3-hydroxypropyl)-4-methanesulphonylpiperazine (9 g.) in toluene for 4 hours under reflux. After treatment of the reaction mixture as described in preceding examples and recrystallisation from ethanol, there is obtained 3-dimethylsulphamoyl-10-[3- (4 - methanesulphonyl - 1 - piperazinyl)propoxycarbonyl]-phenthiazine (8.3 g.), M.P. 170° C.

*Example XXVI*

3 - cyano - 10 - [3-(4-methanesulphonyl-1-piperazinyl)-propoxycarbonyl]-phenthiazine (54 g.) is heated for 1 hour at about 200° C. at a pressure of 1 mm. Hg with powdered glass (5.4 g.). It is then heated to about 80° C. with agitation with toluene (500 cc.) and N hydrochloric acid (150 cc.). On concentration of the decanted toluene, there is recovered 3-cyanophenthiazine (6.5 g.). The aqueous acid solution and the oily precipitated hydrochloride are treated with sodium hydroxide ($d=1.33$, 20 cc.) and agitated at 50° C. with benzene (250 cc.). On decantation and cooling, the benzene solution gives 3 - cyano - 10 - [3 - (4 - methanesulphonyl-1-piperazinyl)propyl]phenthiazine (28 g.), melting at 166–168° C. after recrystallization from benzene.

3 - cyano - 10 - [3 - (4 - methanesulphonyl - 1 - piperazinyl))propoxycarbonyl]phenthiazine is obtained by running a solution of 1-(3-hydroxypropyl)-4-methanesulphonylpiperazine (177.6 g.) in chloroform (150 cc.) into a warm solution of 3-cyano-10-phenthiazinylcarbonyl chloride (114.6 g.) in toluene (500 cc.). The chloroform is distilled for 1 hour and the residue is heated under reflux for 7 hours. It is then treated with water (400 cc.) and sodium hydroxide ($d=1.33$, 50 cc.) is added. The aqueous liquors are decanted and washed with benzene. The organic layer is agitated with N hydrochloric acid (500 cc.) and the aqueous solution is decanted and treated with sodium hydroxide ($d=1.33$, 75 cc.) and the base is extracted with ethyl acetate (500 cc. followed by 2×250 cc.). On concentration there is obtained 3-cyano-10 - [3 - (4 - methanesulphonyl-1-piperazinyl)propoxycarbonyl]phenthiazine (140 g.) which, after recrystallisation from ethyl acetate, melts at 162–163° C.

*Example XXVII*

3 - dimethylsulphamoyl - 10 - [3-(4-methanesulphonyl-1-piperazinyl)propyl]phenthiazine (5.1 g.) is heated under reflux for 5 hours with acetone (75 cc.) and methyl iodide (5 cc.). On distillation of the solvent and recrystallisation from ethanol (450 cc.), there is obtained 3 - dimethylsulphamoyl - 10 - [3 - (4 - methanesulphonyl-1-piperazinyl)propyl]phenthiazine methiodide (6 g.), M.P. about 216–218° C. with decomposition.

*Example XXVIII*

Tablets are prepared having the following composition:

| | Mg. |
|---|---|
| 3 - dimethylsulphamoyl - 10 - [3 - (4 - methanesulphonyl-1-piperazinyl)propyl]phenthiazine | 5 |
| Starch | 112 |
| Dry powdered silica gel | 30 |
| Magnesium stearate | 3 |

*Example XXIX*

Tablets are prepared having the following composition:

| | Mg. |
|---|---|
| 3 - dimethylsulphamoyl - 10 - [3 - (4 - methanesulphonyl-1-piperazinyl)propyl]phenthiazine | 20 |
| Starch | 112 |
| Dry powdered silica gel | 30 |
| Magnesium stearate | 3 |

Example XXX

Suppositories are prepared having the following composition:

| | Mg. |
|---|---|
| 3-dimethylsulphamoyl - 10 - [3-(4-methanesulphonyl-1-piperazinyl)propyl]phenthiazine | 10 |
| Cacao butter | 2900 |

The 3 - dimethylsulphamoyl-10[3-(4-methanesulphonyl-1-piperazinyl)propyl]phenthiazine employed in the combustions of Examples XXVIII to XXX may be replaced by any of the other products of Examples II to XXVII.

We claim:

1. A member of the class consisting of phenthiazine derivatives of the formula:

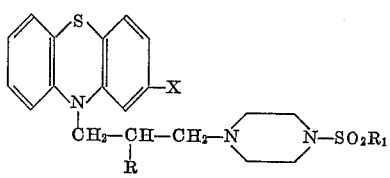

wherein X represents a member of the class consisting of hydrogen, halogen atoms, lower alkyl, lower alkoxy, lower alkanoyl, cyano, methylthio, methanesulphonyl, dimethylsulphamoyl and trifluoromethyl groups, R represents a member of the class consisting of hydrogen and methyl and $R_1$ represents lower alkyl, and their non-toxic acid addition salts.

2. The compound 3-cyano-10-[3-(4-methanesulphonyl-1-piperazinyl)propyl]phenthiazine.

3. The compound 3-methanesulphonyl-10-[3-(4-methanesulphonyl-1-piperazinyl)propyl]phenthiazine.

4. The compound 3 - dimethylsulphamoyl - 10 - [3-(4-methanesulphonyl-1-piperazinyl)-propyl]phenthiazine.

5. The compound 3-cyano-10-[3-(4-ethanesulphonyl-1-piperazinyl)-propyl]phenthiazine.

6. The compound 3-dimethylsulphamoyl-10[3-(4-ethanesulphonyl-1-piperazinyl)-propyl]phenthiazine.

7. The compound 3-methanesulphonyl-10-[3-(4-methanesulphonyl - 1 - piperazinyl) - 2 - methylpropyl]phenthiazine.

8. The compound 3 - dimethylsulphamoyl - 10 - [3-(4-methanesulphonyl - 1 - piperazinyl) - 2 - methylpropyl]phenthiazine.

References Cited in the file of this patent

UNITED STATES PATENTS

| | | |
|---|---|---|
| 2,838,507 | Cusic | June 10, 1958 |
| 2,877,224 | Jacob | Mar. 10, 1959 |
| 2,889,322 | Jacob | June 2, 1959 |
| 2,898,336 | Gailliot et al. | Aug. 4, 1959 |
| 2,902,485 | Horclois | Sept. 1, 1959 |
| 2,944,054 | Gordon | July 5, 1960 |

FOREIGN PATENTS

| | | |
|---|---|---|
| 780,193 | Great Britain | July 31, 1957 |

OTHER REFERENCES

Craig: J. Org. Chem., vol. 22, pages 709–711 (June 1957).

UNITED STATES PATENT OFFICE
CERTIFICATE OF CORRECTION

Patent No. 3,055,890                      September 25, 1962

Robert Michel Jacob et al.

It is hereby certified that error appears in the above numbered patent requiring correction and that the said Letters Patent should read as corrected below.

Column 7, lines 10 to 12, for "3-methanesulphonyl-10-(4-methanesulphonyl-1-piperazinyl)-2-methylpropyl]phenthiazine" read -- 3-methanesulphonyl-10-[3-(4-methanesulphonyl-1-piperazinyl)-2-methylpropyl]phenthiazine --.

Signed and sealed this 21st day of May 1963.

(SEAL)
Attest:

ERNEST W. SWIDER
Attesting Officer

DAVID L. LADD
Commissioner of Patents